United States Patent [19]

Burton

[11] Patent Number: 4,609,713

[45] Date of Patent: Sep. 2, 1986

[54] PHENOTHIAZINIUM PERHALIDE CROSSLINKING AGENT FOR POLYMER CONTAINING PLURALITY OF SECONDARY AMINE MOIETIES.

[75] Inventor: Willie C. Burton, Baton Rouge, La.

[73] Assignee: The Dow Chemical Company, Midland, Mich.

[21] Appl. No.: 716,079

[22] Filed: Mar. 26, 1985

[51] Int. Cl.$^4$ ............................................... C08J 3/24
[52] U.S. Cl. ............................. 525/417; 525/328.2; 525/349; 525/540
[58] Field of Search ............ 525/417, 540, 349, 328.2

[56] References Cited

U.S. PATENT DOCUMENTS 3,716,602  2/1973  Iwami et al. ..................... 525/349
4,256,858  3/1981  Behr ................................. 525/349

*Primary Examiner*—Harold D. Anderson

[57] ABSTRACT

A process for crosslinking a polymer containing a plurality of secondary amine moieties involves contacting said polymer with a phenothiazinium compound under conditions sufficient to provide a polymer crosslinked through said amine moieties. The crosslinked polymers are useful as anion exchange resins.

6 Claims, No Drawings

PHENOTHIAZINIUM PERHALIDE CROSSLINKING AGENT FOR POLYMER CONTAINING PLURALITY OF SECONDARY AMINE MOIETIES.

BACKGROUND OF THE INVENTION

The present invention relates to the cross-linking of polymers and in particular to those agents which cross-link said polymers.

Polymeric resins in the form of spheroidal beads are used in many applications such as chelating resins and as anion exchange resins. Copolymer particles or beads prepared from polymerized monomers of mono- and poly- ethylenically unsaturated monomers can be converted to anion exchange resins using various techniques. Specifically, a weak base resin can be prepared by haloalkylating poly(vinyl aromatic) copolymer beads and subsequently functionalizing the haloalkylated copolymers using an agent such as ammonia, ethylamine, trimethylamine, dimethylisopropanol ethanol, and the like.

In view of the fact that polymeric anion exchange resins are prepared from crosslinked copolymeric beads or particles which are later functionalized, it would be highly desirable to provide a crosslinked polymer which is useful as an anion exchange resin which is crosslinked after the functionalization is provided to the polymer.

SUMMARY OF THE INVENTION

The present invention is a process for cross-linking a polymer, said polymer containing a plurality of secondary amine moieties, which process comprises contacting the polymer with a phenothiazinium perhalide compound under conditions sufficient to provide cross-linking of the polymer through said amine moieties.

In another aspect, the present invention is a cross-linked polymer comprising a polymer containing secondary amine functionalities crosslinked with a phenothiazinium perhalide compound.

The crosslinked polymers of this invention can be insoluble in most solvents, and can be employed as anion exchange resins.

DETAILED DESCRIPTION OF THE INVENTION

Phenothiazinium perhalide compounds suitable for purposes of this invention are represented by the formula:

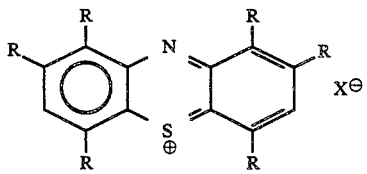

wherein $X^{\ominus}$ is a suitable anion such as a perhalide, most preferably perbromide; and R is an inertly substitutable species such as hydrogen, halogen, alkyl, hydroxylalkyl, aryl, an aromatic ring, and the like. Most preferably R is hydrogen.

Phenothiazinium perhalide compounds are prepared by halogenating a compound such as phenothiazine or a compound of the formula:

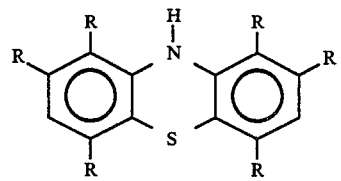

wherein R has been defined hereinbefore.

Representative polymers containing secondary amine functionalities are those polymers containing a nitrogen atom having only one hydrogen atom attached thereto. The secondary amine functionality can be pendant from the polymer backbone or incorporated in the polymer backbone. An example of a suitable polymer having a secondary amine functionality in the polymer backbone is poly(ethyleneimine). Examples of suitable polymers having a secondary amine functionality pendant from the polymer backbone include poly(vinylmethylamine).

By the term "plurality of secondary amine moieties" is meant that the polymer contains a sufficient amount of said amine moieties to provide the desired amount of crosslinking to the polymer. For example, each recurring monomeric unit within the polymer can contain at least one amine moiety as defined hereinbefore; or if desired, the polymer can contain as low as about 1 percent of the recurring monomeric units within the polymer of monomeric units containing the secondary amine moiety. It is desirable to provide a polymer comprising as many secondary amine moieties as is possible.

Crosslinked polymers are prepared by contacting the polymer with the phenothiazinium halide compound in a suitable solvent such that crosslinking occurs. Examples of such solvents include ethanol, methanol, ethanol/water mixtures, and the like. The crosslinked polymer product will generally precipitate from the solvent when crosslinking level is quite high.

Crosslinked polymers are useful as anion exchange resin beads, or in the preparation of rubbery, crosslinked polymers. The crosslinked polymers are insoluble in a wide variety of solvents.

The following example is presented to further illustrate but not limit the scope of this invention. All parts and percentages are by weight unless otherwise indicated.

EXAMPLE

Approximately 1 gram (g) of phenothiazine is dissolved in 100 milliliters (ml) of acetic acid. The solution is held at 25° C. and treated with 5 to 10 ml of 10 percent bromine in acetic acid. The resulting green suspension is treated with concentrated bromine (90 percent in acetic acid solvent) until a brown precipitate results. The resulting phenothiazinium perbromide precipitate is washed with anhydrous ethyl ether and isolated.

About 2 g of the phenothiazinium perbromide is suspended in 50 ml of ethanol and treated with 0.60 g of poly(ethyleneimine) (MW=50,000 to 100,000) in 20 ml of a 50:50 aqueous/ethanol solution. The reaction mixture is heated causing a green precipitate to form. To the mixture is added 0.50 additional grams of phenothiazinium perbromide until a thick slurry of dark blue precipitate forms. The resulting product is rubbery in texture and is insoluble in water, ethanol, methanol, dimethylformamide, and concentrated sulfuric acid.

The polymer contains recurring units of the formula:

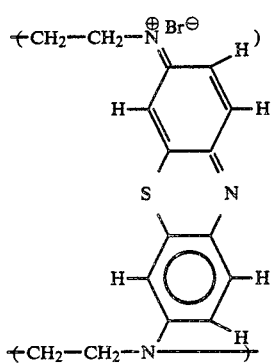

What is claimed is:

1. A process for crosslinking a polymer, said polymer containing a plurality of secondary amine moieties, which process comprises contacting the polymer with a phenothiazinium perhalide compound under conditions sufficient to provide crosslinking of the polymer through said amine moieties.

2. A crosslinked polymer comprising a polymer containing secondary amine functionalities crosslinked with a phenothiazinium perhalide compound.

3. A method of claim 1 wherein said phenothiazinium perhalide compound is represented by the formula:

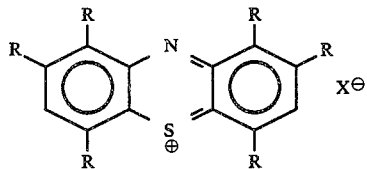

wherein $X^\ominus$ is a perhalide and R is an inert radical.

4. A method of claim 1 wherein said halide is bromide.

5. A method of claim 1 wherein said phenothiazinium perhalide compound is phenothiazinium perbromide.

6. A method of claim 1 wherein said polymer is poly(ethyleneimine).

* * * * *